J. M. GARNER.
HORSE DETACHER.
APPLICATION FILED JAN. 16, 1918.
1,295,153.
Patented Feb. 25, 1919.
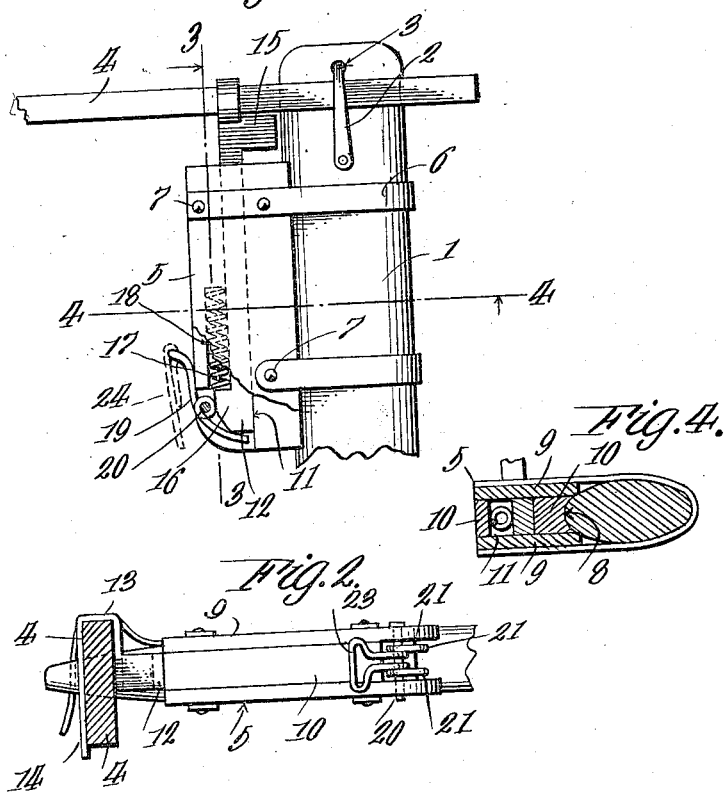
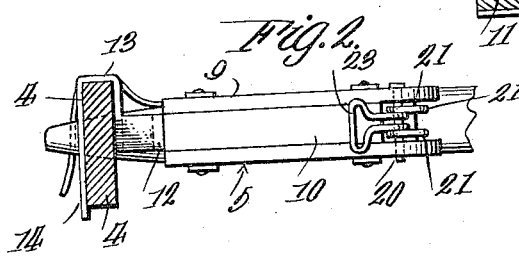
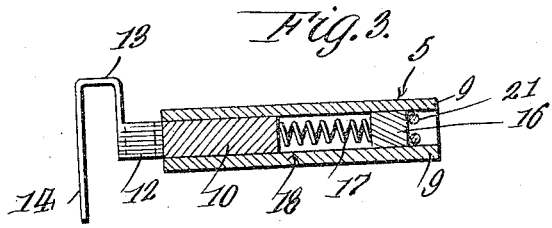
INVENTOR
Joseph M. Garner
WITNESSES
BY
ATTORNEY

UNITED STATES PATENT OFFICE.

JOSEPH M. GARNER, OF PRENTISS, MISSISSIPPI.

HORSE-DETACHER.

1,295,153.   Specification of Letters Patent.   Patented Feb. 25, 1919.

Application filed January 16, 1918. Serial No. 212,072.

*To all whom it may concern:*

Be it known that I, JOSEPH M. GARNER, a citizen of the United States, residing at Prentiss, in the county of Jefferson Davis and State of Mississippi, have invented certain new and useful Improvements in Horse-Detachers, of which the following is a specification.

This invention relates to horse detachers and has for its object the production of a simple and efficient means for quickly and easily detaching a trace from a whiffle tree or the like by means of an operating mechanism which may be operated from the driving seat of the vehicle.

Another object of this invention is the production of a simple and efficient means for gripping the trace and facilitating the moving of the trace from out of engagement with the whiffle tree.

With these and other objects in view, this invention consists of certain novel constructions, combinations and arrangements of parts as will be hereinafter fully described and claimed.

In the drawings:

Figure 1 is a top plan view of the horse detaching mechanism carried by the end of the whiffle tree, Fig. 2 is a front elevation of the horse detaching or releasing mechanism, the trace being shown in section, Fig. 3 is a section taken on line 3—3 of Fig. 1, Fig. 4 is a section taken on line 4—4 of Fig. 1.

By referring to the drawings, it will be seen that 1 designates the whiffle tree which is provided with the usual trace retaining strap 2, secured thereto, the strap 2 being inserted through the aperture 3 formed in the outer end of the whiffle tree 1. The trace 4 of the usual construction is adapted to fit over the whiffle tree 1, in the usual manner, and the strap 2 overhangs the trace 4 as shown in Fig. 1 of the drawings. It should be understood that the strap 2 is only used when it is desired to permanently hold the trace 4 upon the whiffle tree 1 and when it is not expected to be necessary to use the horse detaching mechanism. When the horse detaching or releasing mechanism described as follows is employed, this strap 2 of course is removed from the aperture 3.

A horse releasing or detaching mechanism as shown in the drawings, comprises a releasing casing 5, the casing 5 being firmly held in engagement with the whiffle tree 1 by means of the securing straps 6, these straps passing around the whiffle tree 1 and being secured to the casing 5 by means of suitable rivets or other connecting means 7. This casing 5 is provided with a concaved inner face 8, the concaved inner face 8 fitting snugly around the whiffle tree 1, for the purpose of facilitating the snug engagement of the casing 5, with the whiffle tree 1. It should be understood that this casing 5 may be made of any suitable or desired material and may be made of a single casting or may comprise the upper and lower plates 9, the plates being held in spaced relation by means of the filler-block 10, as shown clearly in Fig. 4 of the drawings. The casing 5 is provided with a longitudinally extending passage-way 11, within which passageway 11 is slidably mounted the releasing bolt 12. This releasing bolt 12 is provided with a hooked outer end 13 as shown in Figs. 2 and 3 of the drawings, and this hooked outer end 13 is provided with an elongated depending lip portion 14. This lip portion 14 is adapted to fit upon the outer face of the trace 4 as shown in Fig. 2 of the drawings, and the outer end of the slidable bolt 12 is provided with a laterally extending foot 15. Furthermore, this laterally extending foot 15 will prevent the bolt 12 from being twisted laterally should the same be accidentally engaged by foreign objects, in view of the fact that this foot 15 will engage the front face of the whiffle tree 1, should any severe strain be applied to the front face of the bolt 12, in this way the foot 15 being capable of bracing the sliding bolt 12, against rearward twisting movement.

A sliding bolt 12 is provided with an overhanging outer end 16; against this outer end 16 is placed a coil spring 17, the coil spring 17 being placed within the pocket 18, formed in one side of the longitudinally extending passageway 11. This spring 17 will normally hold the sliding bolt 12 in a retracted position within the longitudinally extending channel or passageway 11, the overhanging hook portion 13 fitting over the trace 4, firmly holding the trace upon the outer end of the whiffle tree 1 as shown in Fig. 1 of the drawings.

A tripping hook or trigger 19 is pivotally supported upon a supporting bolt 20 carried by the casing 5, and this trigger or hook 19 is preferably formed from a strand of wire having a plurality of forwardly extending engaging fingers 21, these fingers 21 being adapted to engage the inner end of the sliding bolt 12, for the purpose of forcing the bolt 12 longitudinally through the channel or passageways 11 formed in the casing 5. The trigger 9 is then wound around the supporting pin 20 and terminates in an outwardly extending tripping strap engaging loop 23, as shown in Fig. 2 for the purpose of permitting a tripping strap or other suitable operating means 24 shown in dotted lines in Fig. 1 to be attached thereto.

By considering the drawings, it will be seen that the trace 4 normally engages the outer end of the whiffle tree 1 and is engaged also by means of the hooked outer end of the sliding bolt 12. When it is desired to detach the horse, or release the same from the whiffle tree, for any purpose whatever, the operating strap 24 may be pulled for the purpose of swinging the releasing trigger or operating member 19, thereby sliding the bolt 12 longitudinally through the casing 5. As the bolt is moved longitudinally through the casing 5, the trace 4 will be slipped off of the whiffle tree 1 and thereby allow the horse to which the trace is secured to freely move out of engagement with the vehicle to which the horse is attached.

It of course should be understood that certain detail mechanical changes may be made in the present device without departing from the spirit of the invention, so long as these changes fall within the scope of the appended claim.

What is claimed is:

As a new article of manufacture, a horse releasing mechanism comprising a casing adapted to be secured to a whiffle tree and provided with a curved face adapted to fit snugly against the side of a whiffle tree, means for securing said casing to a whiffle tree, a sliding trace engaging bolt carried by said casing and provided with an overhanging hook portion open at the bottom thereof for fitting snugly over a trace, said bolt provided with a rearwardly extending pusher lug adapted to fit snugly against the inner face of a trace for facilitating the removal of a trace from a whiffle tree, said sliding bolt being also provided with a forwardly projecting lug, a spring mounted within said casing and engaging said lug for normally holding said bolt in a retracted position within said casing, a trigger pivotally mounted within the inner end of said casing, and provided with a plurality of projecting fingers engaging the inner end of said bolt and adapted to reciprocate said bolt longitudinally through said casing as said lever is swung, and said lever provided with an outwardly projecting loop extending in front of said casing and adapted to be engaged by an operating member to facilitate the swinging of said lever and the operation of said bolt.

In testimony whereof I affix my signature in presence of two witnesses.

JOSEPH M. GARNER.

Witnesses:
A. H. HALL,
ALETHA BAKER.

Copies of this patent may be obtained for five cents each, by addressing the "Commissioner of Patents, Washington, D. C."